3,367,881
EXTRACTION METHOD FOR PREPARING
UO₂ MICROSPHERES
Leon E. Morse, Oak Ridge, Tenn., assignor to the United
States of America as represented by the United States
Atomic Energy Commission
No Drawing. Filed June 1, 1967, Ser. No. 643,329
6 Claims. (Cl. 252—301.1)

ABSTRACT OF THE DISCLOSURE

A method of making a uranous sol from an aqueous uranous nitrate solution by extracting a portion of the nitrate from the aqueous solution with an organic solution of an amine, permitting the aqueous phase containing a portion of nitrate to adjust to the lowered nitrate conditions, and then extracting additional nitrate from the resulting solution.

Background of the invention

The invention described herein was made in the course of, or under, a contract with the United States Atomic Energy Commission.

My invention relates to methods of making actinide sols from aqueous actinide nitrate solutions and more specifically to liquid-liquid extraction methods of making uranium-containing sols using an amine as an extracting agent.

In sol-gel processes for making actinide oxide or actinide carbide particles useful as a nuclear reactor fuel, an aqueous actinide nitrate solution is denitrated to an optimum nitrate content, the resulting solution is heated to provide an aquasol, and the sol is dehydrated to form a gel which is dried and fired. In the step of making the sol the nitrate content of the nitrate solution is critical. An insufficient amount of nitrate in this step results in a final product having an undesirably low density, while too much nitrate produces an unstable sol, flocculation of crystallites, and a low-density final product. The mole ratio of nitrate to actinide may range from 0.04 to 0.4 depending on the specific actinide involved and on the size and aggregation of particles making up the sol.

Methods of denitration have included thermal decomposition, steam denitration, precipitation of the actinide values followed by partial removal of the soluble nitrates by washing, and extraction of nitrate values from the aqueous solutions with an organic solution of an amine. Inasmuch as liquid-liquid extraction processes are amenable to remote operation and to continuous processing, removal of nitrate from an aqueous solution, such a process is attractive. However, the desired low nitrate concentration has not been achieved for solutions containing high concentrations of uranium values. Useful low nitrate sols of pure hexavalent uranium have not been made by any method. Copending application Ser. No. 613,048, filed Jan. 31, 1967, in the name of John G. Moore, for Preparation of Actinide Sols by Amine Extraction, now Patent No. 3,335,095, issued Aug. 8, 1967, describes one extraction method of removing nitrate which is however limited to solutions containing a maximum uranyl to thorium ratio of about 2:1. Previous attempts to extract nitrate from an aqueous solution of tetravalent uranium resulted in the formation of a gelatinous third phase. A liquid-liquid extraction method is desirable which is capable of removing nitrate from a solution wherein uranium values are essentially the only actinide value present.

Summary of the invention

It is accordingly one object of my invention to provide an improved method of preparing a uranium-containing sol from an aqueous nitrate solution.

It is another object to provide an improved liquid-liquid extraction method of removing nitrate ions from an aqueous solution consisting essentially of uranous nitrate.

Other objects of my invention will become apparent from the following description and attached claims.

In accordance with my invention I have provided a method of making a uranous sol from an aqueous nitrate solution containing tetravalent uranium comprising contacting said aqueous solution with a first organic solution of an amine, said amine being present in an amount less than the stoichiometric equivalent of the nitrate present in the aqueous phase; separating the resulting organic and aqueous phases; aging the separated aqueous phase to permit the ions present in the separated aqueous phase to adjust to the nitrate-deficient conditions; and contacting the resulting aged solution with a second organic solution of an amine.

My process is capable of reducing the nitrate concentration in an aqueous phase to a level suitable for use in forming an aquasol even with solutions consisting essentially of uranous nitrate.

As used herein the term "uranous" is intended to refer to uranium in the tetravalent oxidation state.

Description of the preferred embodiments

While my method may be used to make aquasols from an aqueous solution containing tetravalent uranium together with other actinide nitrates it is especially useful in making an aquasol from a solution consisting essentially of uranous nitrate, and my invention will be illustrated with such a solution.

Considering my invention in detail, in the first step of carrying out my process the nitrate solution containing tetravalent uranium is contacted with a water-immiscible organic solution of an amine, said amine being present in an amount substoichiometric to the amount of nitrate in the aqueous phase.

The concentration of uranous ion is not critical and it may vary over a wide range. The concentration employed is ordinarily determined by the composition of feed solution available such as the product from a solvent extraction metal recovery process. The solutions normally used will contain uranous ion in a range of 0.2 to 1.5 molar. Aqueous phases having a higher concentrations are difficult to process because of the problems associated with reducing uranium in a highly concentrated solution.

Slight amounts, e.g. up to 3 percent hexavalent uranium in the aqueous solution, based on the total uranium content, are not harmful; however, reduction of virtually all the uranium to the tetravalent step is readily accomplished, and is preferred.

Although nitrate may be the only anion present in a significant concentration, in the preferred method of carrying out my invention formate is provided in the aqueous phase in a nitrate to formate mole ratio in the range of 4:1 to 8:1, the formate functioning as a holding reductant. The sum of the nitrate and formate concentrations may be in stoichiometric relationship to the uranous values present, or it may be in excess; ordinarily, however, it is deficient in these ions.

The pH of the aqueous phase is not a dependent variable, but is controlled by the anion to uranous ratio, and will typically be in the range of 1 to 1.5.

Although a longer contact time may be used, extraction of nitrate is virtually complete within 5 to 10 minutes at room temperature.

The organic phase comprises an organic solvent and an amine selected from primary, secondary, and tertiary amines having at least 10 carbon atoms in the molecule. The tertiary amines ordinarily extract more uranium together with the nitrate than do the other amines and therefore are less desirable extractants than primary or secondary amines. The organic solvent may be any of the compounds normally used as a diluent for amines in liquid-liquid extraction processes, such as the aliphatic hydrocarbons, aromatic solvents, aromatic petroleum fractions, ketones, nitrohydrocarbons and chlorinated solvents. The primary, secondary, and tertiary amines and diluents described as useful in U.S. Patent No. 2,877,250, issued Mar. 10, 1959, to Keith B. Brown, David J. Crouse, Jr., and John G. Moore, for Recovery of Uranium Values, are useful in my process.

The amount of nitrate removed in this step is critical since uranium values will precipitate if too much is removed, and an excessive amount of uranous ion will oxidize during the succeeding digestion step if too little is removed. One mole of amine is theoretically capable of extracting one mole of nitrate, and in order to prevent precipitation of uranium the mole ratio of amine to nitrate must be less than 0.9:1 and is preferably between 0.5:1 and 0.67:1. Under these preferred conditions about 50 to 67 percent of the nitrate will be removed.

The temperature at which this nitrate extraction step is carried out is not critical and may suitably range from 20 to 50° C.

The aqueous and organic phases are then separated and the ions in the aqueous phase are permitted to reach equilibrium under the nitrate-deficient conditions. At room temperature a time of about one day may be necessary, and consequently in the preferred method of carrying out my invention the aqueous solution is digested at an elevated temperature. Temperatures between 45 and 60° C. may be used and a temperature of 50–55° C. is preferred. A temperature greater than 60° C. results in excessive oxidation of uranous to uranyl while a temperature below 45° C. requires an inordinately long time to reach equilibrium. Within a temperature range of 50–55° C. equilibrium is reached rapidly, i.e., within 15 to 30 minutes, yet little uranous ion is oxidized.

The digested aqueous phase is then contacted with an additional amount of an organic solution of an amine. In order to complete nitrate removal in this step at least one mole of amine per mole of nitrate must be provided. An excess of at least 50 percent may be used since the nitrate extraction is self-limiting.

The temperature of this second extraction step may range from 25 to 50° C.; however, the preferred temperature is in the range of 35 to 45° C., permitting use of the digested aqueous phase directly without an intervening cooling step.

A contact time of 5 to 10 minutes will reduce the nitrate concentration to a level of 0.08 to 0.12 mole of nitrate per mole of tetravalent uranium, which is within the range suitable for gel formation.

The extraction steps and the digestion step must be carried out in the presence of an inert atmosphere to minimize oxidation of uranous ion. The nitrate present oxidizes a portion of the uranous ion; however the final solution may contain up to 15 percent hexavalent uranium based on the total uranium content.

The aqueous and organic phases are then separated. While the remaining steps of treating the aqueous phase do not constitute a part of my invention, a brief discussion of them will be given for a more complete understanding of the entire sol-gel process. The dilute sol from the second extraction stage is evaporated to a uranous concentration suitable for sphere formation, i.e., 1 to 1.5 molar total uranium, and is then fed into a column containing an organic compound such as 2-ethylhexanol capable of removing water from the sol, thus forming gelled spheres, which are dried and calcined in air to yield the desired product. More details on these and other aspects of a sol-gel process are disclosed in U.S. Patent No. 3,290,122, issued Dec. 6, 1966, in the name of Sam D. Clinton, Paul A. Haas, George J. Hirth, and Alfred T. Kleinsteuber, for Process for Preparing Oxide Gel Microspheres from Sols.

Having thus described my invention the following example is offered to illustrate it in more detail.

EXAMPLE

An aqueous solution 0.2 molar in $UO_2^{+2}$, 0.4 molar in nitrate and 0.1 molar in formate was reduced to a uranous solution using hydrogen in the presence of a platinic catalyst as a reducing agent. One volume of the resulting uranous solution was contacted with two volumes of an organic solution consisting of 0.1 molar N-lauryl trialkyl-methylamine in a n-paraffin hydrocarbon containing mainly n-dodecane for 10 minutes at 25–30° C. in an inert atmosphere. The resulting aqueous phase, 0.2 molar in nitrate, was separated from the organic phase and was digested at 50–55° C. for 30 minutes. The digested solution was contacted with two volumes of an organic extractant identical in composition to the extractant employed in the first extracting step. The resulting aqueous phase, a hydrous uranous sol, 0.02 molar in nitrate, was separated from the organic phase and evaporated to a uranium concentration of 1.39 molar.

The concentrated hydrous urania sol was formed into microspheres by passing it into a column containing 2-ethylhexanol, and the resulting spheres were dried and fired. The fired microspheres had a uranium to oxygen ratio of 2.006 and a density of 10.75.

The above example is intended to illustrate and not to limit my invention. It is obvious that changes in the concentrations and compositions of the aqueous phase and organic solutions and in the number of extraction steps may be made without departing from the invention.

I claim:

1. A method of making a uranous oxide sol from an aqueous nitrate solution containing tetravalent uranium comprising
    (a) contacting said aqueous solution with a first organic solution of an amine, said amine being present in an amount less than the stoichiometric equivalent of the nitrate present in the aqueous phase;
    (b) separating the resulting aqueous and organic phases;
    (c) aging the separated aqueous phase to permit the ions present in the separated aqueous phase to adjust to the nitrate-deficient conditions;
    (d) contacting the resulting aged solution with a second organic solution of an amine; and
    (e) separating the resulting uranous sol from the resulting amine solution.

2. The method of claim 1 wherein in step (a) the first organic solution contains less than 0.9 mole of amine per mole of nitrate in the aqueous phase.

3. The method of claim 1 wherein in step (a) the first organic solution contains 0.5 to 0.67 mole of amine per mole of nitrate in the aqueous phase.

4. The method of claim 1 wherein in step (c) the separated aqueous phase is aged by digesting it at a temperature of 45 to 60° C.

5. The method of claim 1 wherein in step (c) the separated aqueous phase is aged by digesting it at a temperature of 50 to 55° C. for 15 to 30 minutes.

6. The method of claim 1 wherein in step (a) the first organic solution contains 0.5 to 0.67 mole of amine per mole of nitrate in the aqueous phase and in step (c) the separated aqueous phase is aged by digesting at a temperature of 50 to 55° C. for 15 to 30 minutes.

References Cited

UNITED STATES PATENTS

| | | | |
|---|---|---|---|
| 3,151,085 | 9/1964 | Smith et al. | 252—301.1 |
| 3,256,204 | 6/1966 | O'Connor | 252—301.1 |
| 3,335,095 | 8/1967 | Moore | 252—301.1 |

CARL D. QUARFORTH, *Primary Examiner.*

M. J. SCOLNICK, *Assistant Examiner.*